US011223475B2

(12) United States Patent
Singh et al.

(10) Patent No.: US 11,223,475 B2
(45) Date of Patent: Jan. 11, 2022

(54) DOCUMENT VALIDATION

(71) Applicant: International Business Machines Corporation, Armonk, NY (US)

(72) Inventors: Nitin Singh, Bangalore (IN); Pankaj S. Dayama, Bangalore (IN); Vinayaka Pandit, Bangalore (IN); Kameshwaran Sampath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 16/432,424

(22) Filed: Jun. 5, 2019

(65) Prior Publication Data

US 2020/0389313 A1 Dec. 10, 2020

(51) Int. Cl.
*H04L 9/32* (2006.01)
*G06F 16/93* (2019.01)
*G06F 16/901* (2019.01)
*H04L 9/06* (2006.01)
*G06F 16/23* (2019.01)

(52) U.S. Cl.
CPC ........ *H04L 9/3218* (2013.01); *G06F 16/2379* (2019.01); *G06F 16/9024* (2019.01); *G06F 16/93* (2019.01); *H04L 9/0637* (2013.01); *H04L 2209/38* (2013.01)

(58) Field of Classification Search
CPC ..... H04L 9/3218; H04L 9/14; G06F 16/2379; G06F 16/93; G06F 16/9024
USPC ........................................................ 713/153
See application file for complete search history.

(56) References Cited

U.S. PATENT DOCUMENTS

| | | | |
|---|---|---|---|
| 8,423,501 B2 | 4/2013 | Wu et al. | |
| 9,842,201 B2 | 12/2017 | Follis et al. | |
| 9,880,988 B2 | 1/2018 | Vanderwende et al. | |
| 10,110,576 B2 | 10/2018 | Ateniese et al. | |
| 10,120,537 B2 | 11/2018 | Ho | |
| 10,162,850 B1 | 12/2018 | Jain et al. | |
| 10,169,483 B2 | 1/2019 | Pitschke | |
| 2017/0243193 A1 | 8/2017 | Manian et al. | |
| 2018/0158034 A1* | 6/2018 | Hunt | G06Q 20/027 |
| 2018/0173719 A1 | 6/2018 | Bastide et al. | |
| 2018/0204213 A1* | 7/2018 | Zappier | H04L 63/10 |
| 2018/0219685 A1 | 8/2018 | Deery et al. | |
| 2018/0268401 A1 | 9/2018 | Ortiz et al. | |
| 2019/0026496 A1 | 1/2019 | Wilson | |
| 2020/0162238 A1* | 5/2020 | Yoon | H04L 63/0428 |
| 2020/0195437 A1* | 6/2020 | Gallagher | H04L 9/0637 |

OTHER PUBLICATIONS

Lakmal et al.; "IDStack—The Common Protocol For Document Verification Built On Digital Signatures", NITC IEEE International Conf. On, pp. 96-99, Sep. 14-15, 2018.

(Continued)

*Primary Examiner* — Jacob Lipman

(57) ABSTRACT

An example operation may include one or more of receiving, by a document validation node, documents from a plurality of document owner nodes over a blockchain network, generating, by the document validation node, commitments for the documents on the blockchain network, deriving, by the document validation node, proofs to verify predicates of the documents, and generating, by the document validation node, a document relationship graph (DRG) based on the commitments and the predicates.

20 Claims, 19 Drawing Sheets

(56) References Cited

OTHER PUBLICATIONS

Marujo et al.; "Privacy-Preserving Multi-Document Summarization", PIR'15 2nd ACM SIGIR Workshop On, pp. 1-4, Aug. 13, 2015.
Ramachandran et al.; "SmartProvenance: A Distributed, Blockchain Based Data Provenance System", CODASPY'18 8th ACM International Conference On, pp. 35-42, Mar. 19-21, 2018.
Weggenmann et al.; "SynTF: Synthetic And Differentially Private . . . Privacy-Preserving Text Mining", SIGIR'18 41th ACM SIGIR Conference On, pp. 305-314, Jul. 8-12, 2018.

* cited by examiner

540

700

DOCUMENT VALIDATION

TECHNICAL FIELD

This application generally relates to a storage system, and more particularly, to document validation.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and no failure occurs (for example, a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

As such, what is needed is a blockchain-based solution that overcomes these drawbacks and limitations. Business-to-business collaborations on blockchain networks need to meet two contrasting requirements: to prove certain assertions about business documents and to hide business sensitive information contained in these documents. Provision of predicates on documents may have the following limitations: Public Key Infrastructure (PKI) based schemes have huge overheads caused by key management and may not provide an efficient way for handling privacy constraints; standard non-interactive-zero-knowledge (NIZK) frameworks (e.g., Pinnochio, Schnorr, BulletProofs) natively support proving correct computation of pure functions but do not adequately handle predicates on document commitments. A subset of the functions may require different setup for each function.

Currently, limitations related to expressing relationships between documents exist. There are no systems which maintain relationships between documents in a privacy preserving manner while minimizing generation of zero knowledge proofs on the documents. Universal circuit based systems like TinyRAM may natively prove correct execution of RAM machine over initial memory commitment. However, these systems are unsuitable for expressing similarity/inclusion relationships between documents.

Accordingly it is desired to have a method and system for privacy preserving document validation in blockchain networks.

SUMMARY

One example embodiment provides a system that includes a processor and memory, wherein the processor is configured to perform one or more of receive documents from a plurality of document owner nodes over a blockchain network, generate commitments for the documents on the blockchain network, derive proofs to verify predicates of the documents, and generate a document relationship graph (DRG) based on the commitments and the predicates.

Another example embodiment provides a method that includes one or more of receiving, by a document validation node, documents from a plurality of document owner nodes over a blockchain network, generating, by the document validation node, commitments for the documents on the blockchain network, deriving, by the document validation node, proofs to verify predicates of the documents, and generating, by the document validation node, a document relationship graph (DRG) based on the commitments and the predicates.

A further example embodiment provides a non-transitory computer readable medium comprising instructions, that when read by a processor, cause the processor to perform one or more of receiving documents from a plurality of document owner nodes over a blockchain network, generating commitments for the documents on the blockchain network, deriving proofs to verify predicates of the documents, and generating a document relationship graph (DRG) based on the commitments and the predicates.

DETAILED DESCRIPTION

Figure 1:
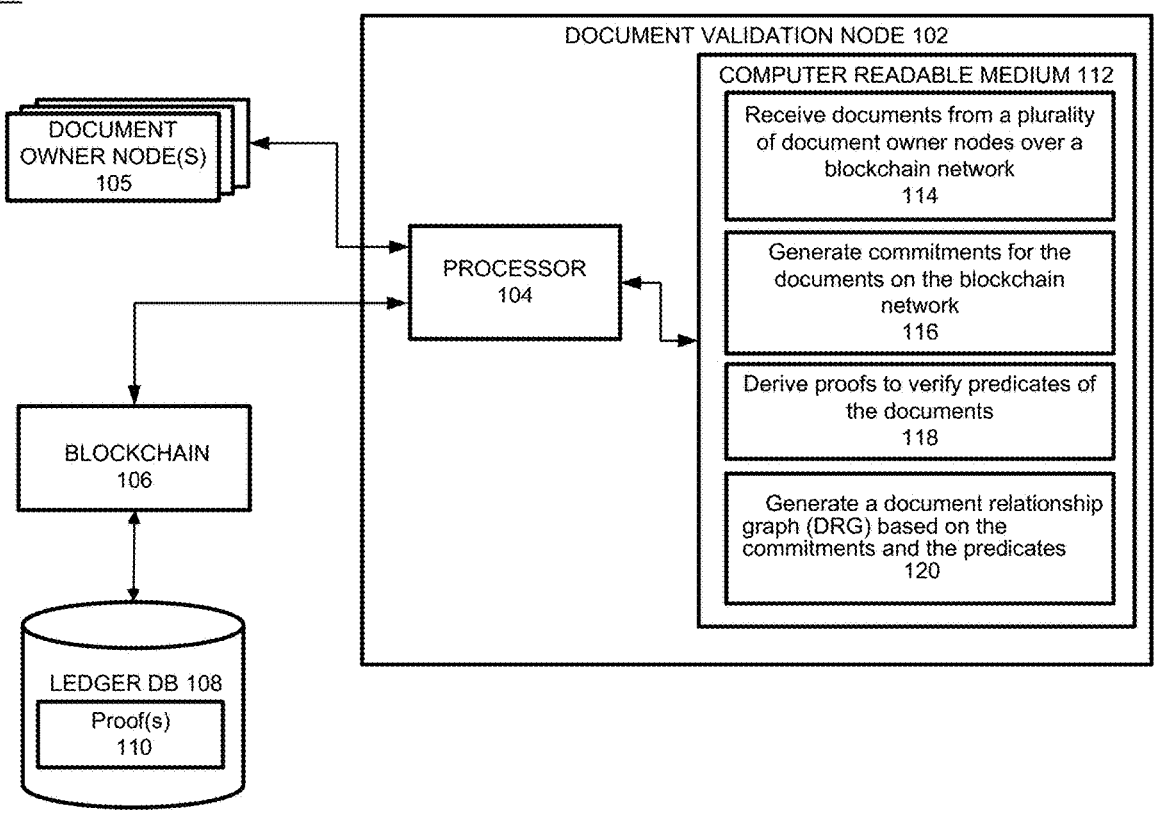
FIG. 1 illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for a privacy preserving document validation in blockchain networks.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for a privacy preserving document validation in blockchain networks. The exemplary embodiments solve the issues of time and trust by extending features of a database such as immutability, digital signatures and being a single source of truth. The exemplary embodiments provide a solution for a privacy preserving document validation in a blockchain-based network. The blockchain networks may be homogenous based on the asset type and rules that govern the assets based on the smart contracts.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for a privacy preserving document validation in blockchain networks is implemented due to immutable accountability, security, privacy, permitted decentralization, availability of smart contracts, endorsements and accessibility that are inherent and unique to blockchain. In particular, the blockchain ledger data is immutable and that provides for efficient method for a privacy preserving document validation in blockchain networks. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of a method for a privacy preserving document validation in blockchain networks.

One of the benefits of the example embodiments is that it improves the functionality of a computing system by implementing a method for a privacy preserving document validation in blockchain networks blockchain-based systems. Through the blockchain system described herein, a computing system can perform functionality for a privacy preserving document validation in blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a Business Network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the business network, it does not create trusted collaboration and does not provide for an efficient storage of digital assets. The traditional database does not provide for a tamper proof storage and does not provide for preservation of the digital assets being stored. Thus, the proposed method for a privacy preserving document validation in blockchain networks cannot be implemented in the traditional database.

Meanwhile, if a traditional database were to be used to implement the example embodiments, the example embodiments would have suffered from unnecessary drawbacks such as search capability, lack of security and slow speed of transactions. Additionally, the automated method for a privacy preserving document validation in the blockchain network would simply not be possible.

Accordingly, the example embodiments provide for a specific solution to a problem in the arts/field of document validation in the blockchain networks.

The example embodiments also change how data may be stored within a block structure of the blockchain. For example, a digital asset data may be securely stored within a certain portion of the data block (i.e., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

According to the exemplary embodiments, a method and system for a privacy preserving document validation in blockchain networks are provided. The exemplary embodiments may address three common scenarios:

(1) Basic Validation may:
Prove that the tax computation in an invoice is correct without revealing any details like price, tax amount, quantity, and tax slab; and
Prove that appropriate insurance has been purchased, based on the value of shipment without revealing other sensitive information.

(2) Reusing Proofs:
Leveraging proofs for predicates established on earlier versions for updated versions.

(3) Collaborative Analytics:
Produce verifiable claims over data, where multiple parties endorse parts of the data based on a need-to-see basis.

According to the exemplary embodiments, a basic zero knowledge (ZK) module may be implemented. The ZK module may execute methods for generating constant sized document commitments, and for proving and verifying predicates on documents in a privacy preserving manner. The ZK module may use hashing algorithms and available NIZK frameworks. A document relationship graph (DRG) may be used. The DRG may represent a graph with document commitments as nodes. Each node stores the predicates and the proofs for the predicates proven on the document. Graph edges are added to express similarity/inclusion relationships with associated proofs for the same predicates. An inference system may use the known predicates and the relationship graph to infer new predicates on a node. This may involve mathematical inference when possible. A blockchain-vetted aggregation may be used on of permissioned blockchain network with appropriate endorsement policies and chaincodes to compare and endorse hashes of documents, and verify the proof of aggregated statistics. The exemplary embodiments allow a user to exhibit truthful inclusion of contents of documents owned by multiple stakeholders into an aggregate document using proofs of inclusion. This, in turn, enables an untrusted common aggregator to prove predicates on aggregate document with approval of respective stakeholders.

FIG. 1 illustrates a logic network diagram for a privacy preserving document validation in a blockchain network, according to example embodiments.

Referring to FIG. 1, the example network 100 includes a document validation node 102 connected to other nodes (not shown) and to document owner node(s) 105. The document validation node 102 may be connected to a blockchain 106 that has a ledger 108 for storing proofs 110 on documents' predicates. While this example describes in detail only one document validation node 102, multiple such nodes may be connected to the blockchain 106. It should be understood that the document validation node 102 may include additional components and that some of the components described herein may be removed and/or modified without departing from a scope of the document validation node 102 disclosed herein. The document validation node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the document validation node 102 may include multiple processors, multiple cores, or the like, without departing from the scope of the document validation node 102 system.

The document validation node 102 may also include a non-transitory computer readable medium 112 that may have stored thereon machine-readable instructions executable by the processor 104. Examples of the machine-readable instructions are shown as 114-120 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 114 to receive documents from a plurality of document owner nodes 105 over a blockchain network 106. As discussed above, the blockchain ledger 108 may store proofs on document predicates 110. The blockchain 106 network may be configured to use one or more smart contracts that manage transactions for multiple participating nodes. The processor 104 may fetch, decode, and execute the machine-readable instructions 116 to generate commitments for the documents on the blockchain network 106. The processor 104 may fetch, decode, and execute the machine-readable instructions 118 to derive proofs to verify predicates of the documents. The processor 104 may fetch, decode, and execute the machine-readable instructions 120 to generate a document relationship graph (DRG) based on the commitments and the predicates. Thus, a privacy preserving document validation is provided.

Figure 2A:
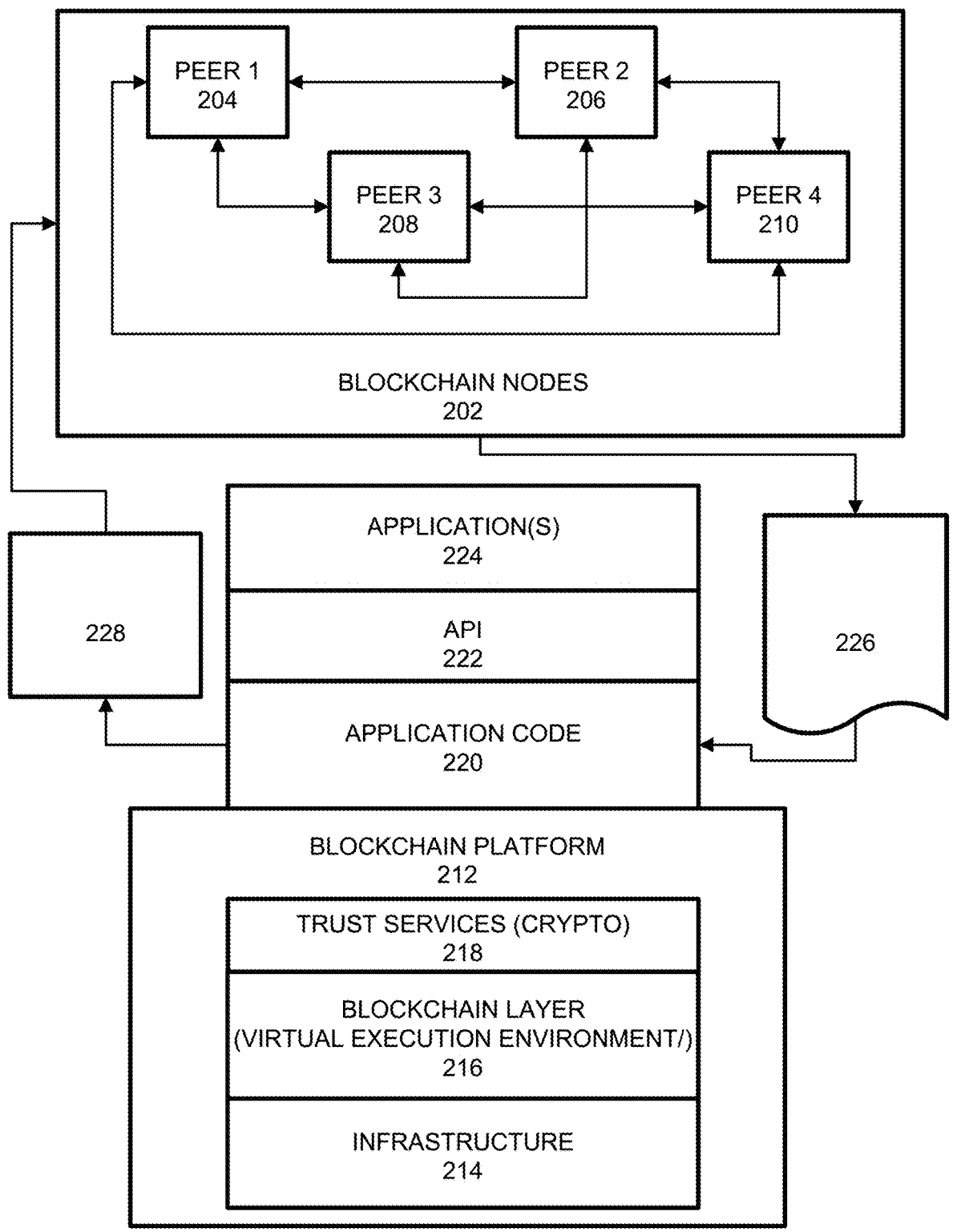
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document-related information 226 may be processed by one or more processing entities (e.g., virtual machines) included in the blockchain layer 216. The result 228 may include document commitments and predicates. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
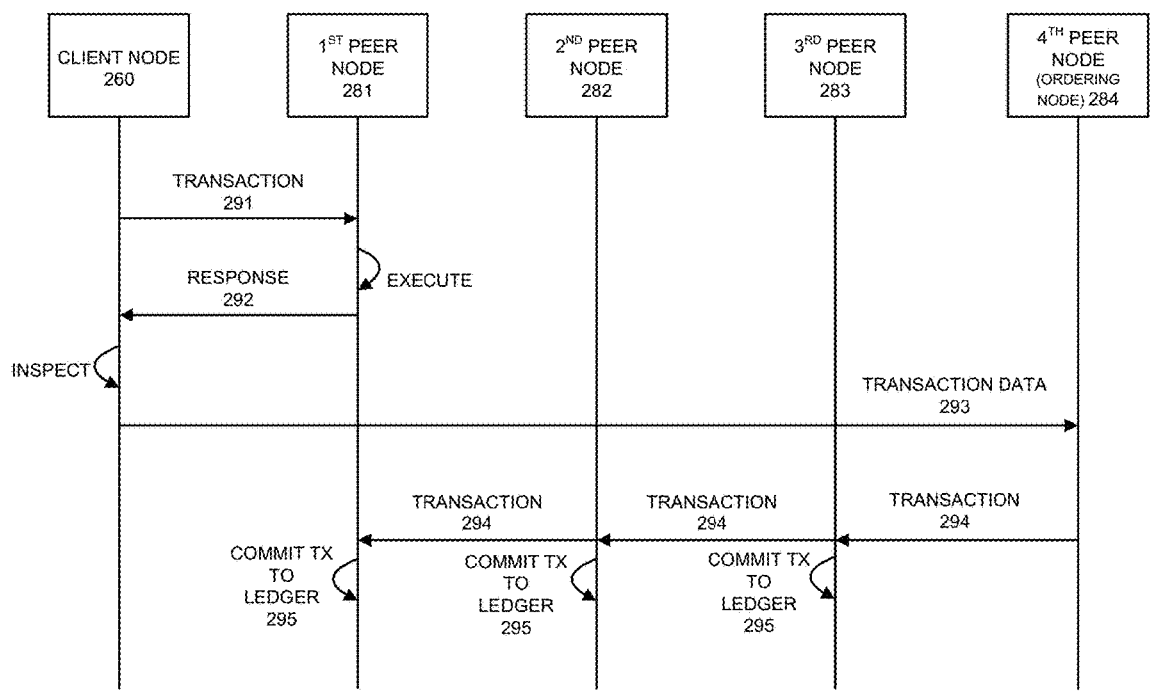
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
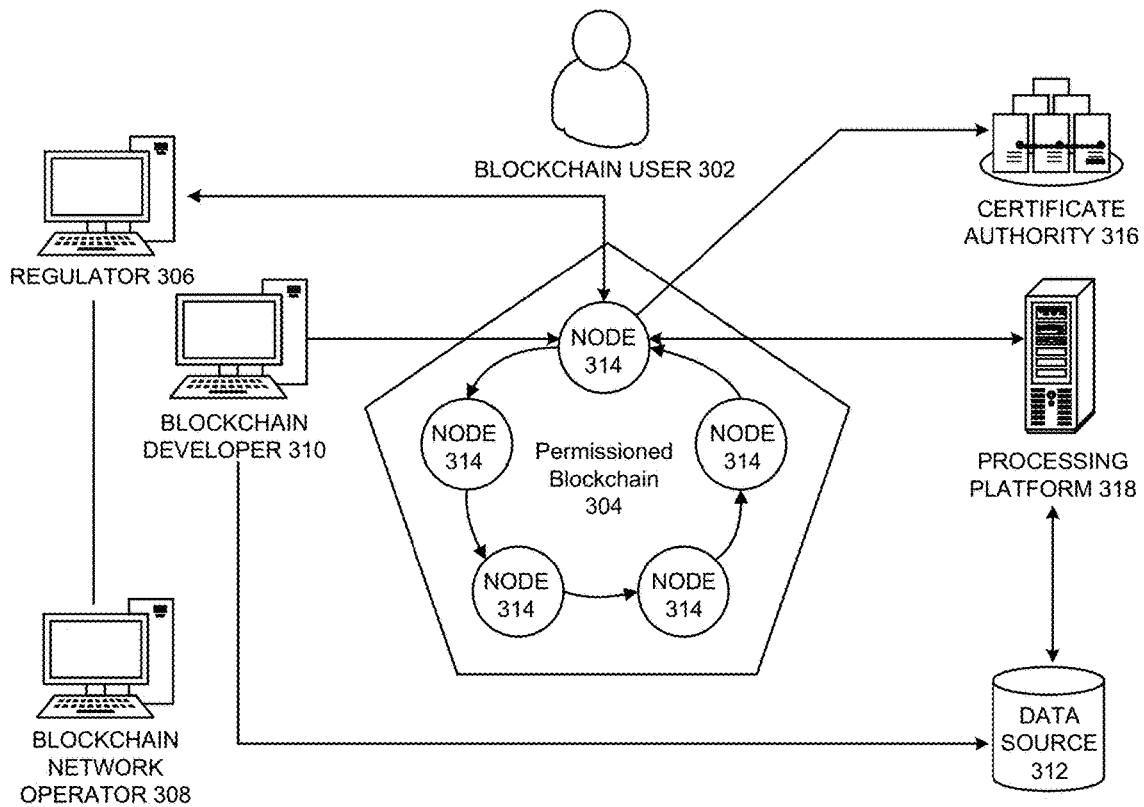
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
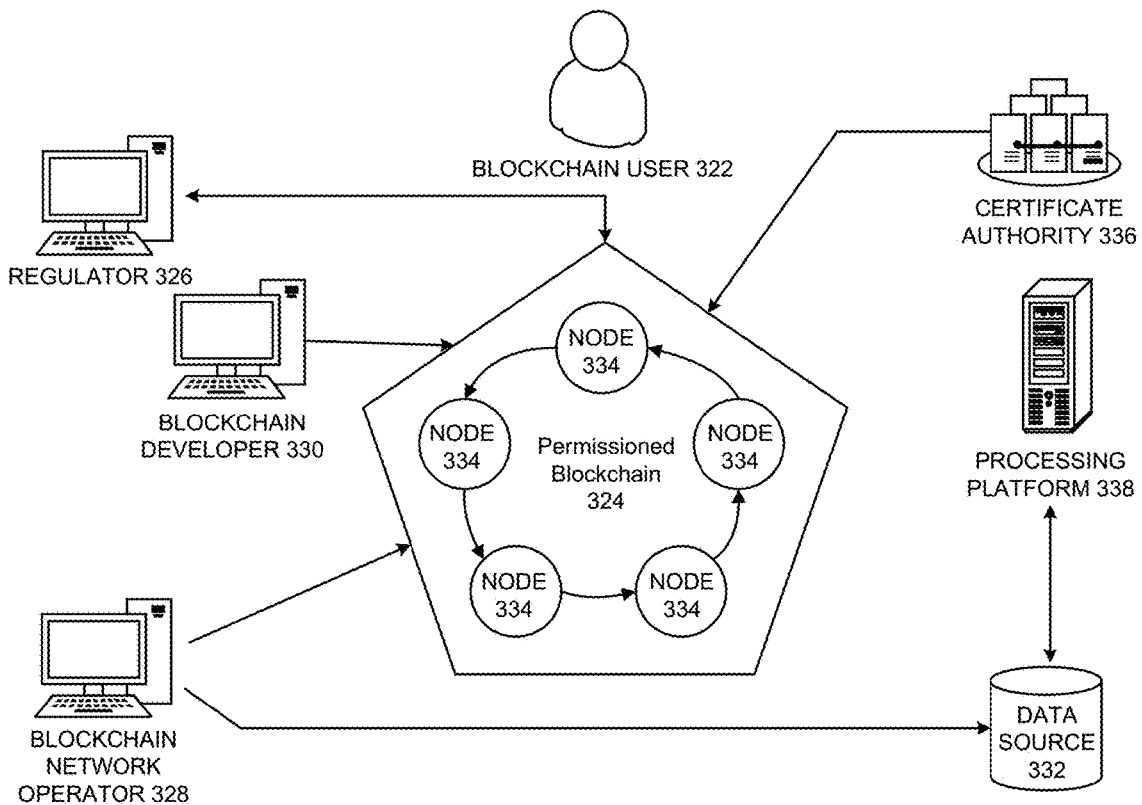
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
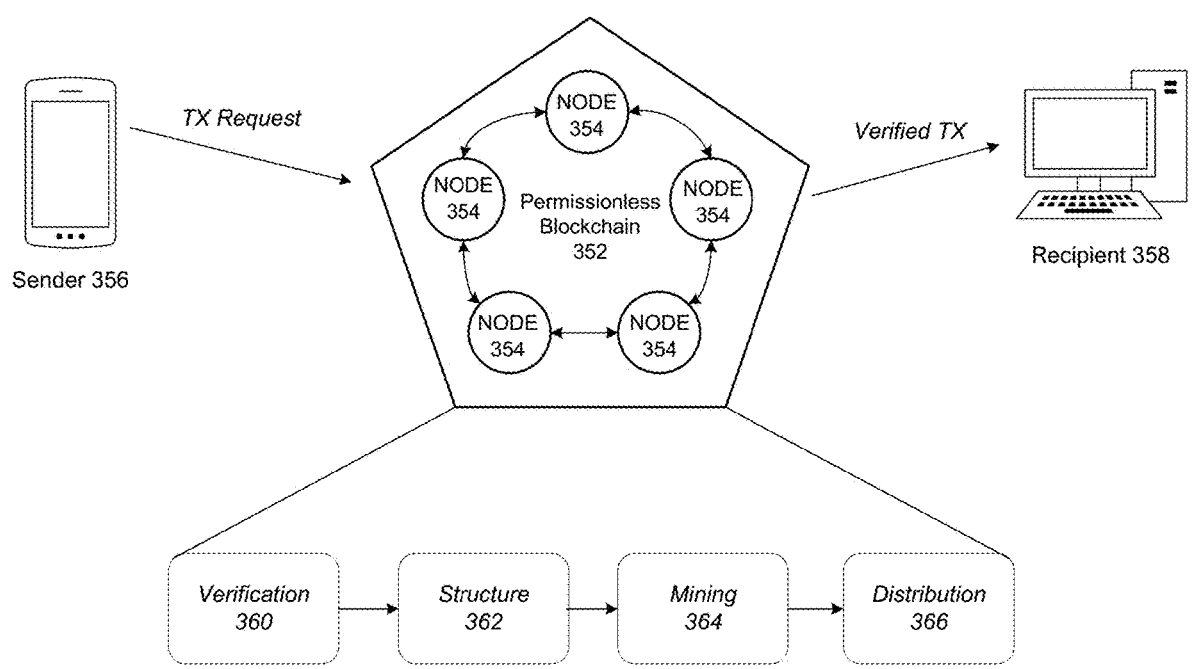
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
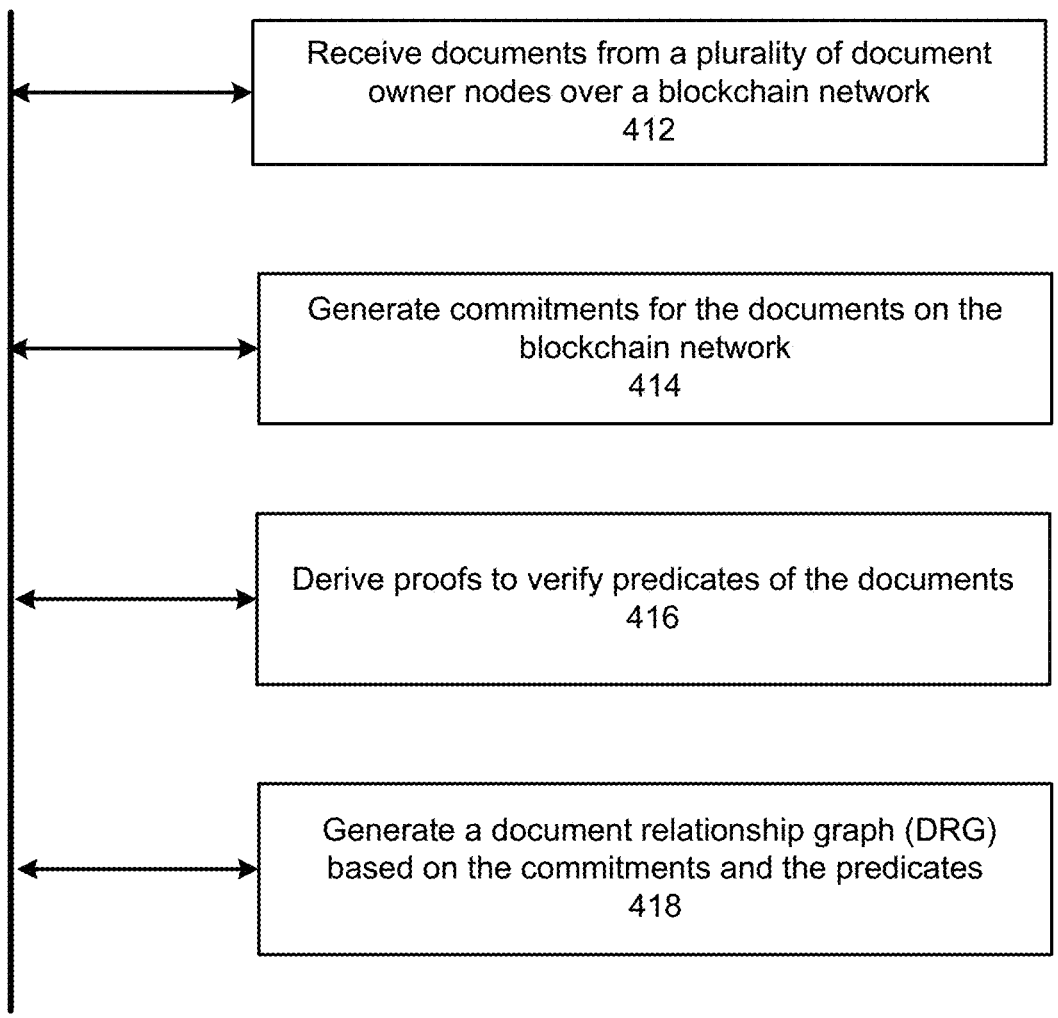
FIG. 4A illustrates a flow diagram, according to example embodiments.

FIG. 4A illustrates a flow diagram 400 of an example method of privacy preserving document validation in blockchain networks, according to example embodiments. Referring to FIG. 4A, the method 400 may include one or more of the steps described below.

FIG. 4A illustrates a flow chart of an example method executed by the document validation node 102 (see FIG. 1). It should be understood that method 400 depicted in FIG. 4A may include additional operations and that some of the operations described therein may be removed and/or modified without departing from the scope of the method 400. The description of the method 400 is also made with reference to the features depicted in FIG. 1 for purposes of illustration. Particularly, the processor 104 of the document validation node 102 may execute some or all of the operations included in the method 400.

With reference to FIG. 4A, at block 412, the processor 104 may receive documents from a plurality of document owner nodes over a blockchain network. At block 414, the processor 104 may generate commitments for the documents on the blockchain network. At block 416, the processor 104 may derive proofs to verify predicates of the documents. At block 418, the processor 104 may generate a document relationship graph (DRG) based on the commitments and the predicates.

Figure 4B:
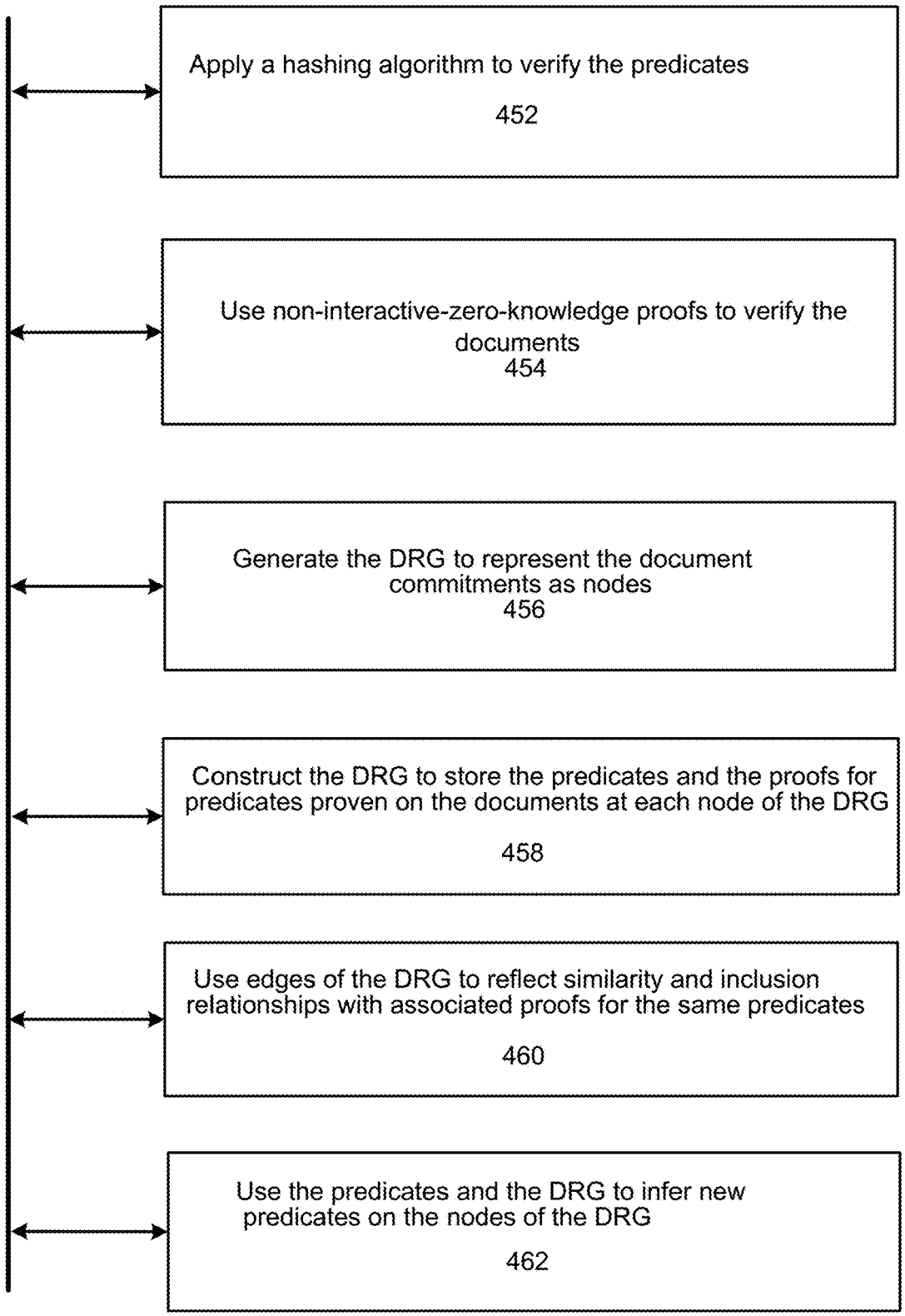
FIG. 4B illustrates a further flow diagram, according to example embodiments.

FIG. 4B illustrates a flow diagram 450 of an example method of privacy preserving document validation in a blockchain network, according to example embodiments. Referring to FIG. 4B, the method 450 may also include one or more of the following steps. At block 452, the processor 104 may apply a hashing algorithm to verify the predicates. At block 454, the processor 104 may use non-interactive-zero-knowledge proofs to verify the documents. At block 456, the processor 104 may generate the DRG to represent the document commitments as nodes. At block 458, the processor 104 may construct the DRG to store the predicates and the proofs for predicates proven on the documents at each node of the DRG. At block 460, the processor 104 may use edges of the DRG to reflect similarity and inclusion relationships with associated proofs for the same predicates. At block 462, the processor 104 may use the predicates and the DRG to infer new predicates on the nodes of the DRG.

Figure 5A:
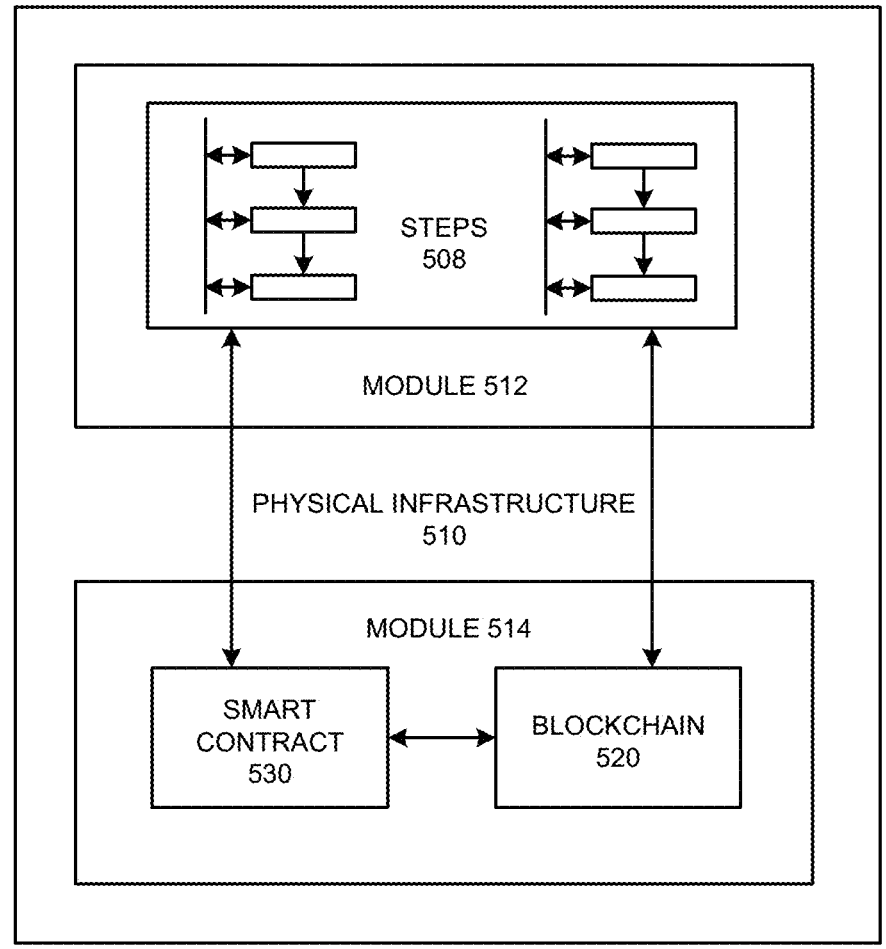
FIG. 5A illustrates an example system configured to perform one or more operations described herein, according to example embodiments.

FIG. 5A illustrates an example system 500 that includes a physical infrastructure 510 configured to perform various operations according to example embodiments. Referring to FIG. 5A, the physical infrastructure 510 includes a module 512 and a module 514. The module 514 includes a blockchain 520 and a smart contract 530 (which may reside on the blockchain 520), that may execute any of the operational steps 608 (in module 612) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
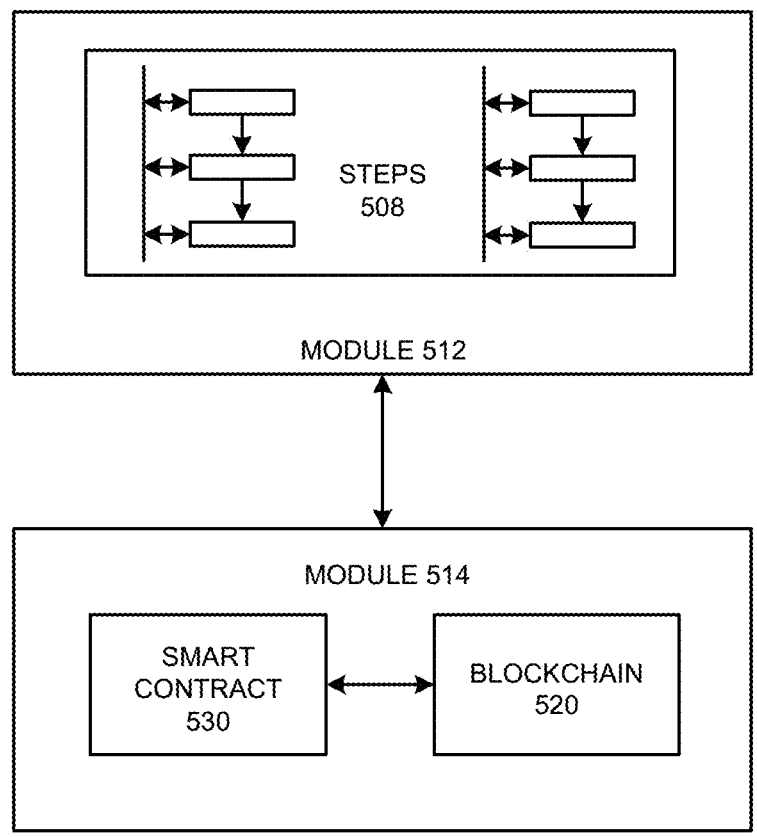
FIG. 5B illustrates another example system configured to perform one or more operations described herein, according to example embodiments.

FIG. 5B illustrates another example system 540 configured to perform various operations according to example embodiments. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5C:
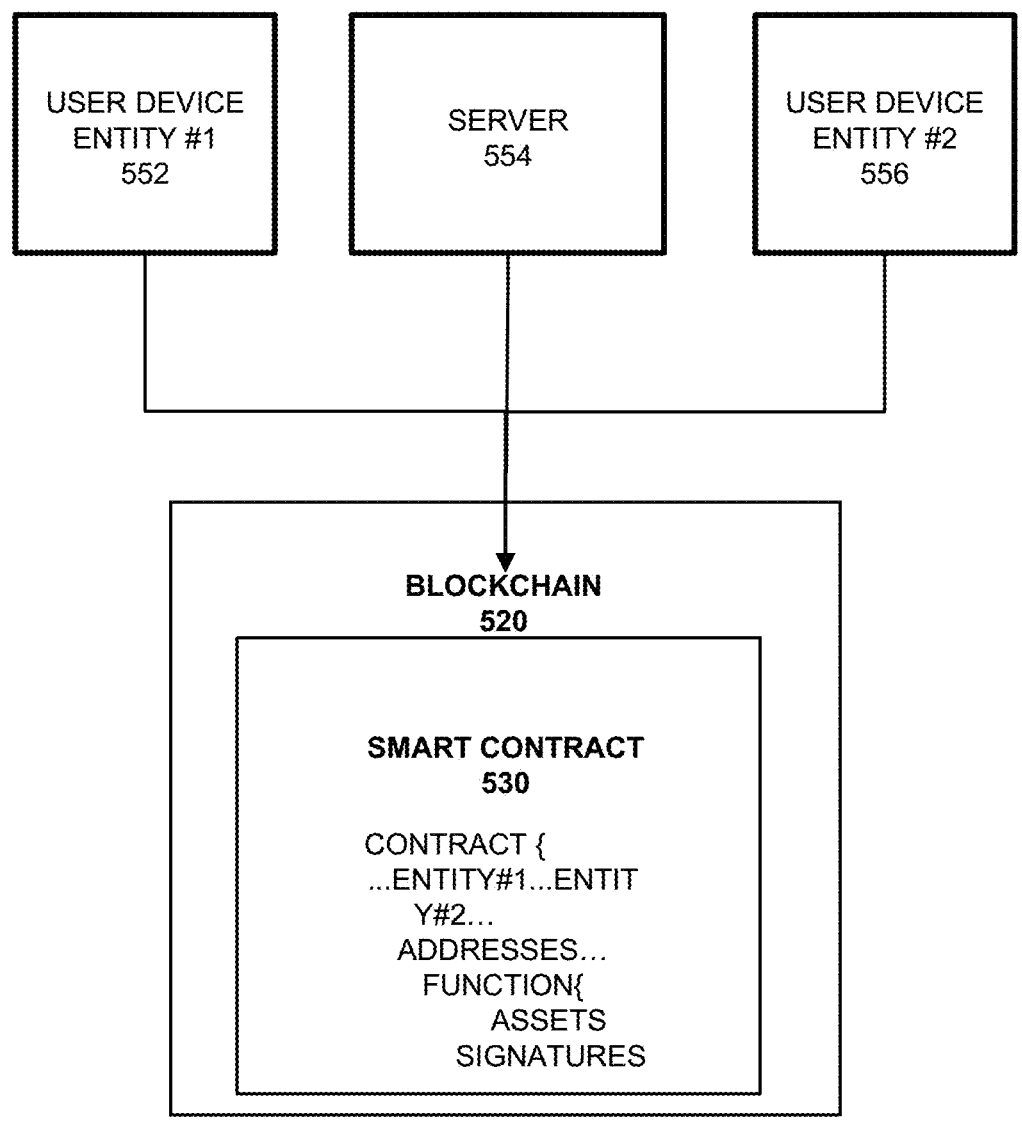
FIG. 5C illustrates a further example system configured to utilize a smart contract, according to example embodiments.

FIG. 5C illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
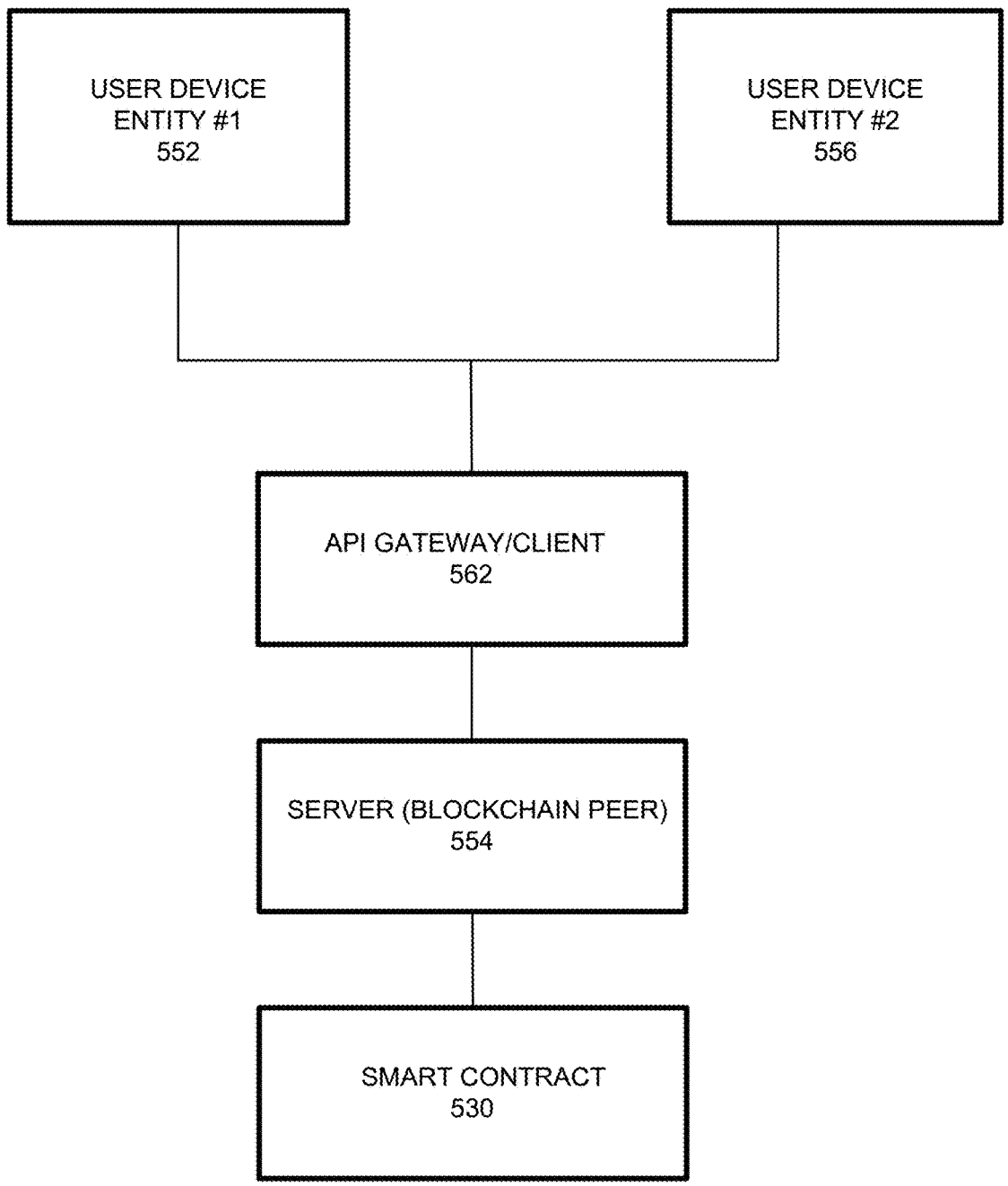
FIG. 5D illustrates yet another example system configured to utilize a blockchain, according to example embodiments.

FIG. 5D illustrates a system 560 including a blockchain, according to example embodiments. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
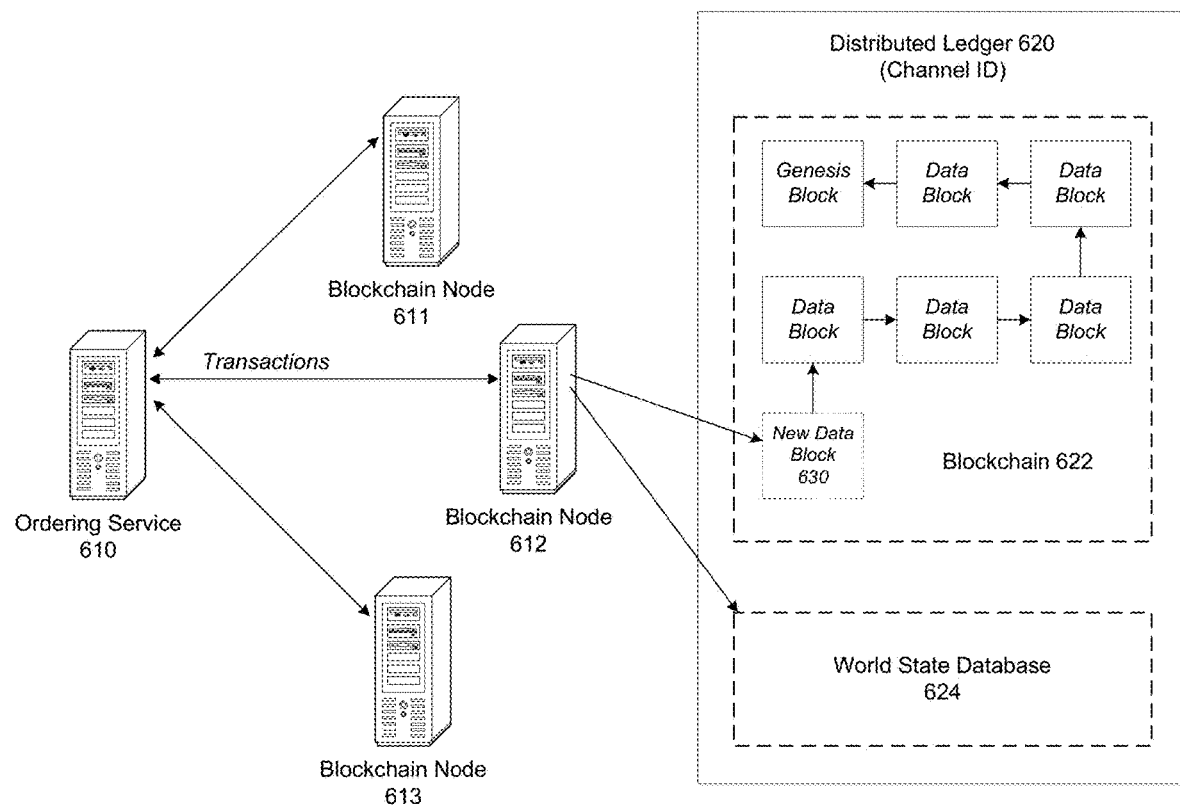
FIG. 6A illustrates a process for a new block being added to a distributed ledger, according to example embodiments.
Figure 6B:
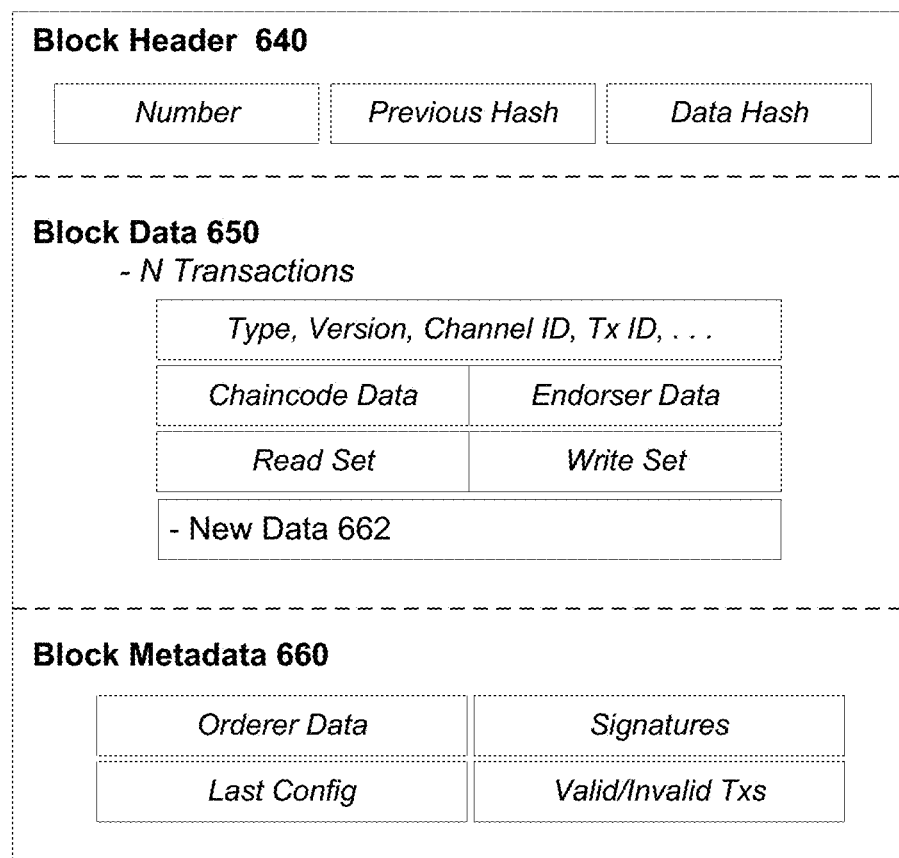
FIG. 6B illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. Referring to FIG. 6A, clients (not shown) may submit transactions to blockchain nodes 611, 612, and/or 613. Clients may be instructions received from any source to enact activity on the blockchain 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 622 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block will still be included in that block, but it will be marked as invalid, and the state database 624 will not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but could also be located in the block header 640 or the block metadata 660.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
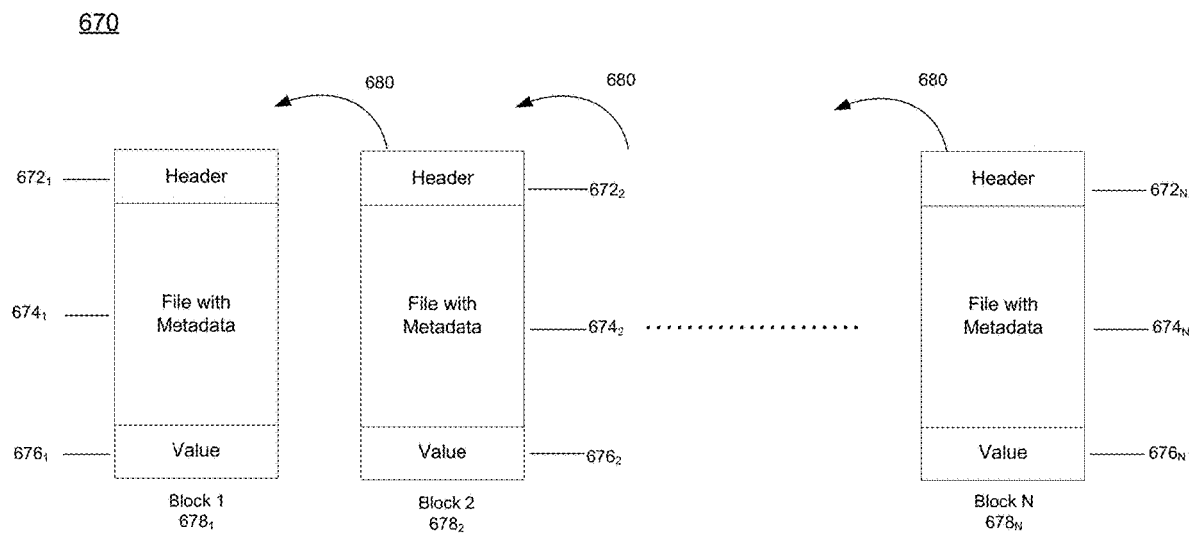
FIG. 6C illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 6C, the blockchain 670 includes a number of blocks $678_1$, $678_2$, ... $678_N$ cryptographically linked in an ordered sequence, where $N \geq 1$. The encryption used to link the blocks $678_1$, $678_2$, ... $678_N$ may be any of a number of keyed or un-keyed Hash functions. In one embodiment, the blocks $678_1$, $678_2$, ... $678_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $678_1$, $678_2$, . . . , $678_N$ may be cryptographically linked by a function that is different from a hash function. For purposes of illustration, the following description is made with reference to a hash function, e.g., SHA-2.

Each of the blocks $678_1, 678_2, \ldots, 678_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In one embodiment, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata.

The other blocks $678_2$ to $678_N$ in the blockchain also have headers, files, and values. However, unlike the first block $672_1$, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)

b) new storage location for the file c) new metadata identified associated with the file d) transfer of access or control of the file from one blockchain participant to another blockchain participant.

Figure 6D:
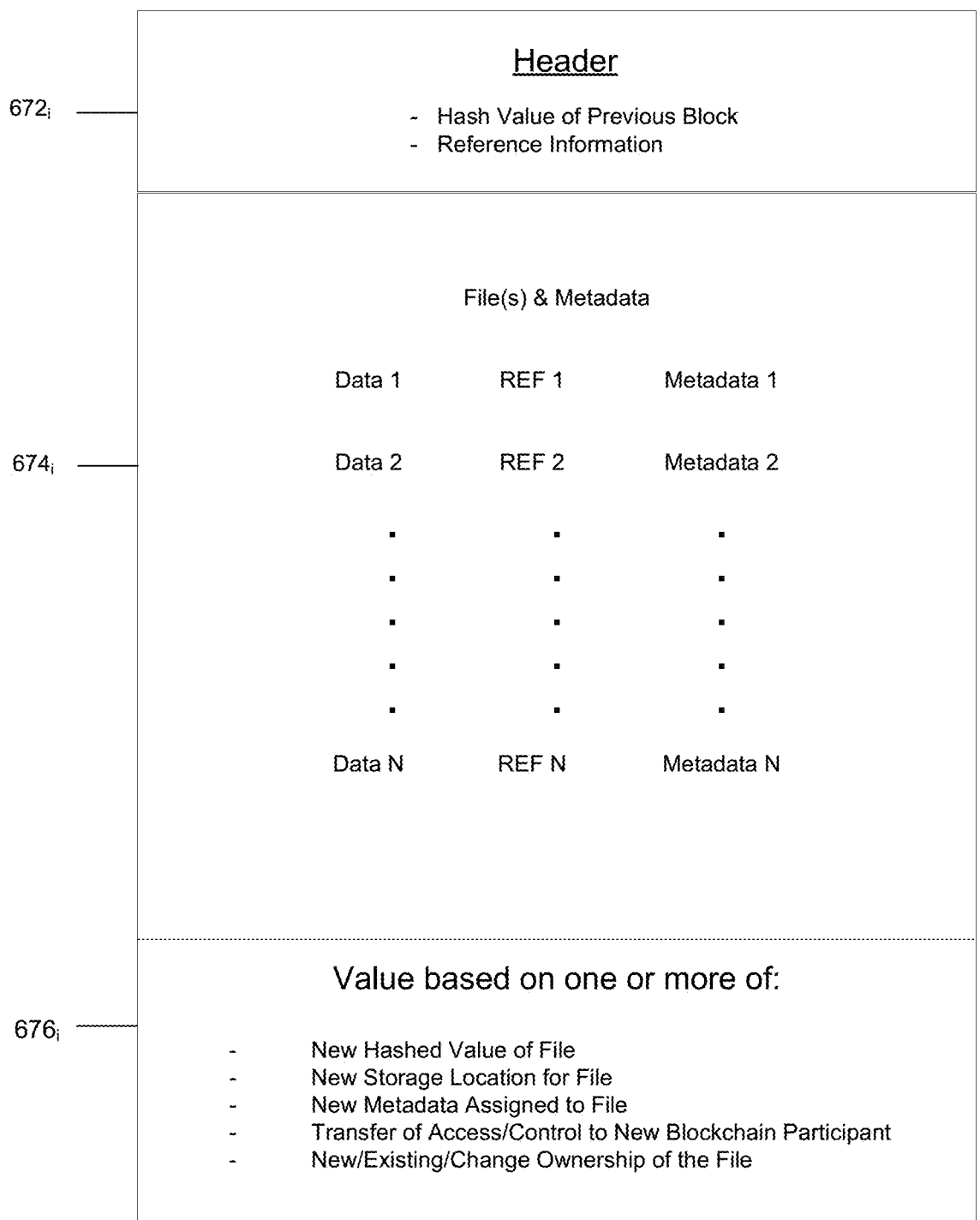
FIG. 6D illustrates a block which may represent the structure of blocks in the blockchain, according to example embodiments.

FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 7A:
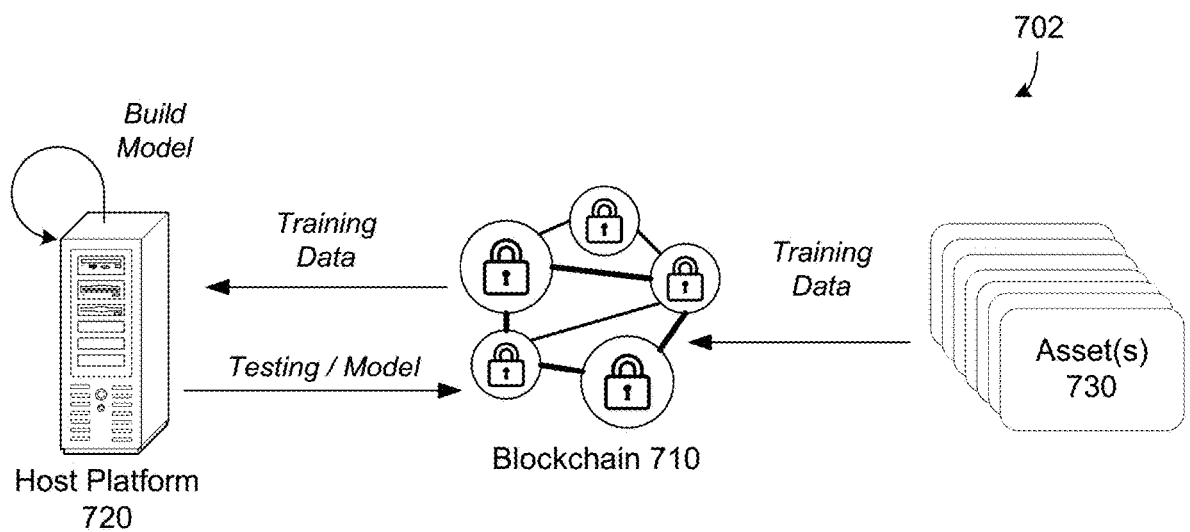
FIG. 7A illustrates an example blockchain which stores machine learning (artificial intelligence) data, according to example embodiments.
Figure 7A:
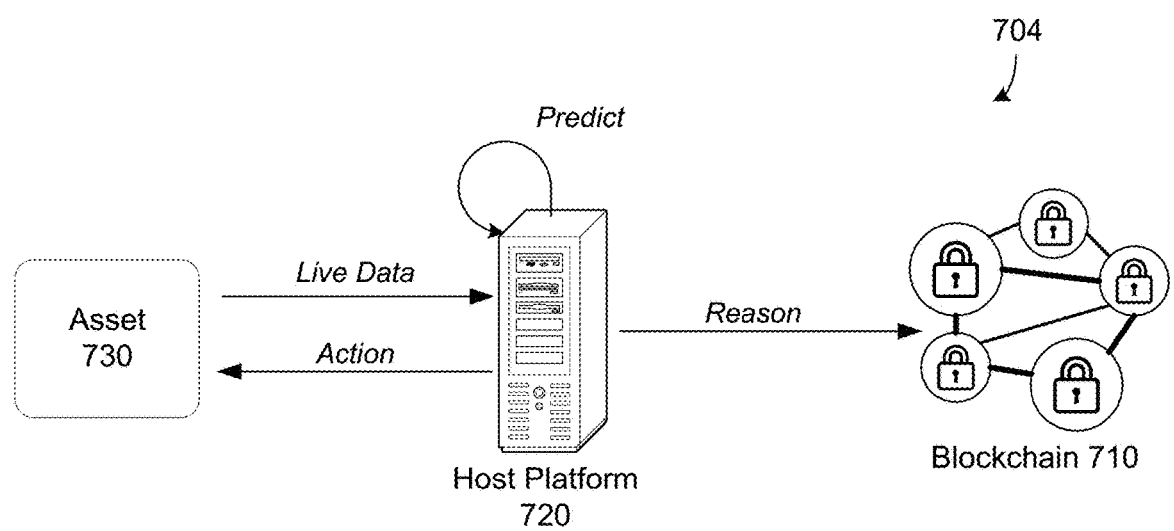
Figure 7B:
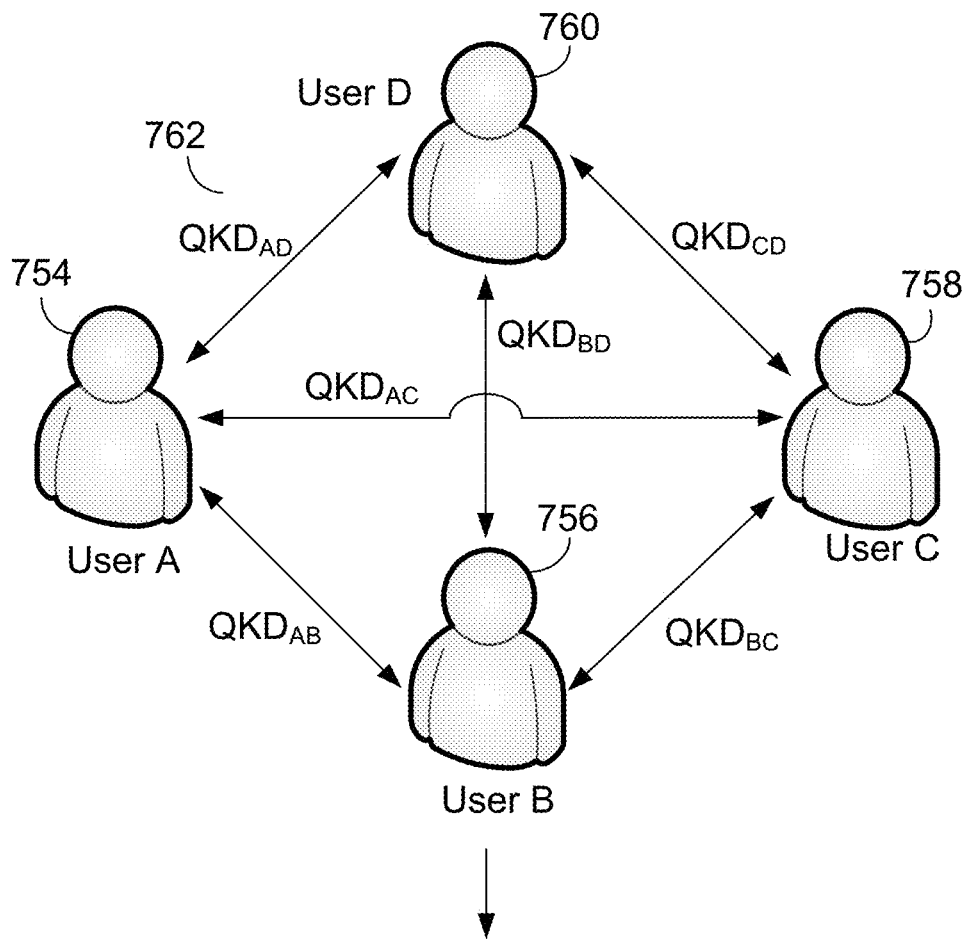
FIG. 7B illustrates an example quantum-secure blockchain, according to example embodiments.
Figure 7B:
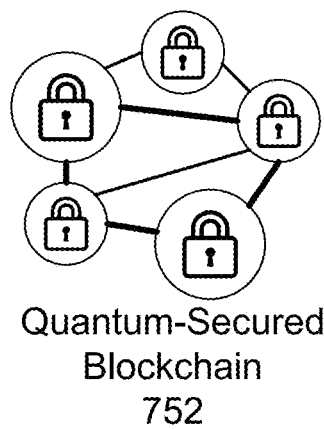

FIGS. 7A and 7B illustrate additional examples of use cases for blockchain which may be incorporated and used herein. In particular, FIG. 7A illustrates an example 700 of a blockchain 710 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 7A, a host platform 720 builds and deploys a machine learning model for predictive monitoring of assets 730. Here, the host platform 720 may be a cloud platform, an industrial server, a web server, a personal computer, a user device, and the like. Assets 730 can be any type of asset (e.g., machine or equipment, etc.) such as an aircraft, locomotive, turbine, medical machinery and equipment, oil and gas equipment, boats, ships, vehicles, and the like. As another example, assets 730 may be non-tangible assets such as stocks, currency, digital coins, insurance, or the like.

The blockchain 710 can be used to significantly improve both a training process 702 of the machine learning model and a predictive process 704 based on a trained machine learning model. For example, in 702, rather than requiring a data scientist/engineer or other user to collect the data, historical data may be stored by the assets 730 themselves (or through an intermediary, not shown) on the blockchain 710. This can significantly reduce the collection time needed by the host platform 720 when performing predictive model training. For example, using smart contracts, data can be directly and reliably transferred straight from its place of origin to the blockchain 710. By using the blockchain 710 to ensure the security and ownership of the collected data, smart contracts may directly send the data from the assets to the individuals that use the data for building a machine learning model. This allows for sharing of data among the assets 730.

The collected data may be stored in the blockchain 710 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 720. Each round may be based on additional data or data that was not previously considered to help expand the knowledge of the machine learning model. In 702, the different training and testing steps (and the data associated therewith) may be stored on the blockchain 710 by the host platform 720. Each refinement of the machine learning model (e.g., changes in variables, weights, etc.) may be stored on the blockchain 710. This provides verifiable proof of how the model was trained and what data was used to train the model. Furthermore, when the host platform 720 has achieved a finally trained model, the resulting model may be stored on the blockchain 710.

After the model has been trained, it may be deployed to a live environment where it can make predictions/decisions based on the execution of the final trained machine learning model. For example, in 704, the machine learning model may be used for condition-based maintenance (CBM) for an asset such as an aircraft, a wind turbine, a healthcare machine, and the like. In this example, data fed back from the asset 730 may be input the machine learning model and used to make event predictions such as failure events, error codes, and the like. Determinations made by the execution of the machine learning model at the host platform 720 may be stored on the blockchain 710 to provide auditable/verifiable proof. As one non-limiting example, the machine learning model may predict a future breakdown/failure to a part of the asset 730 and create alert or a notification to replace the part. The data behind this decision may be stored by the host platform 720 on the blockchain 710. In one embodiment the features and/or the actions described and/or depicted herein can occur on or with respect to the blockchain 710.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 7B illustrates an example 750 of a quantum-secure blockchain 752 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 7B, four users are present 754, 756, 758, and 760. Each of pair of users may share a secret key 762 (i.e., a QKD) between themselves. Since there are four nodes in this example, six pairs of nodes exists, and therefore six different secret keys 762 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 752 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 754-760) authenticate the transaction by providing their shared secret key 762 (QKD). This quantum signature can be attached to every transaction making it exceedingly difficult to tamper with. Each node checks their entries with respect to a local copy of the blockchain 752 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 752. In one embodiment the features and/or the actions described and/or depicted herein can occur on or with respect to the blockchain 752.

Figure 8:
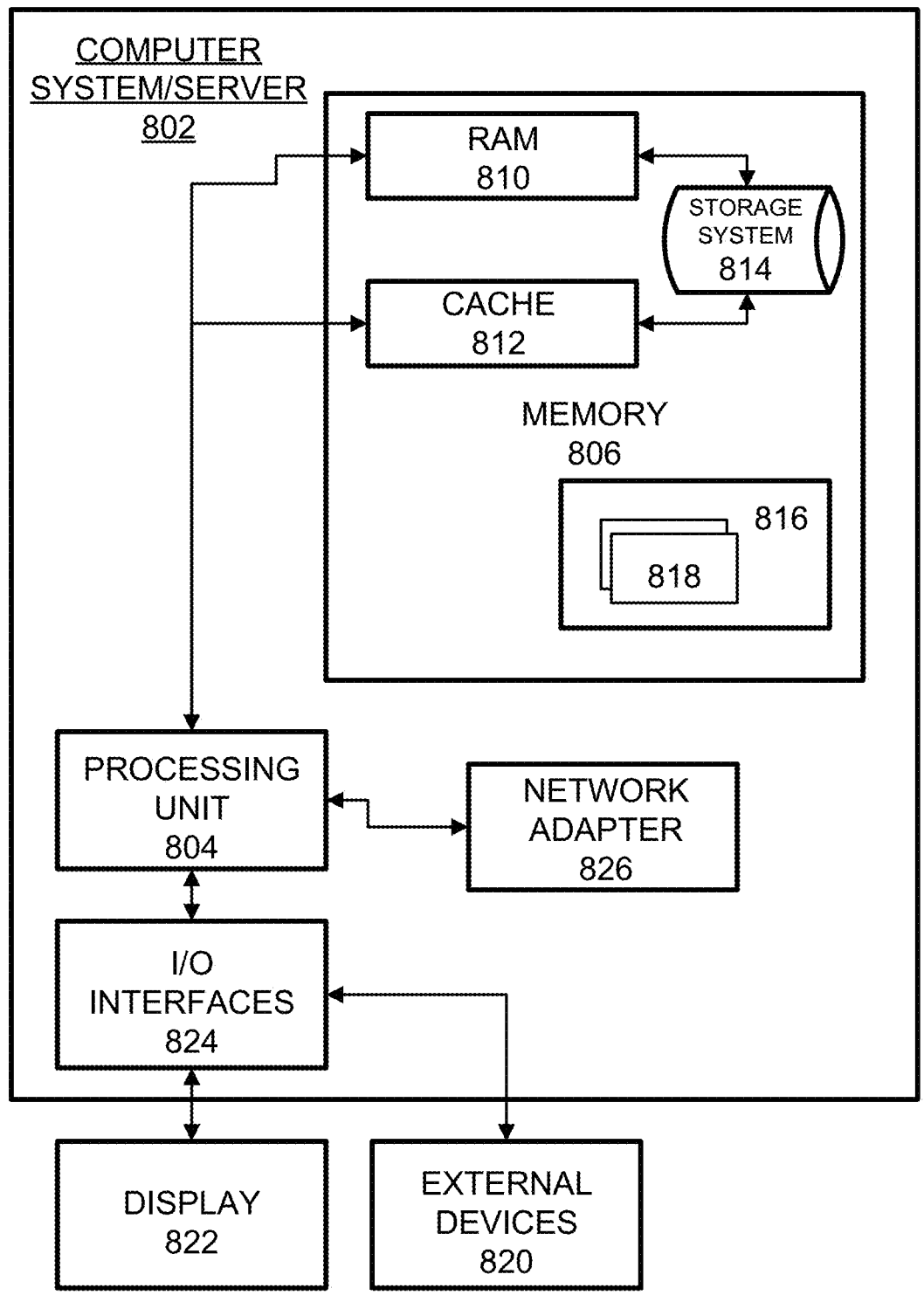
FIG. 8 illustrates an example system that supports one or more of the example embodiments.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A validation node in a blockchain network, the validation node comprising:
   a memory storing one or more instructions; and
   a processor that when executing the one or more instructions is configured to:
   receive documents from a plurality of document owner nodes of the blockchain network;
   generate commitments for the documents on the blockchain network;
   derive proofs to verify predicates of the documents; and
   generate a document relationship graph (DRG) based on the commitments and the predicates.

2. The validation node of claim 1, wherein the processor is further configured to:
   verify the predicates using a hashing algorithm.

3. The validation node of claim 1, wherein the the processor is further configured to:
   verify the documents using non-interactive-zero-knowledge proofs.

4. The validation node of claim 1, wherein the DRG represents the commitments as nodes.

5. The validation node of claim 1, wherein the DRG stores the predicates and the proofs for predicates proven on the documents at each node of the DRG.

6. The validation node of claim 1, wherein the the processor is further configured to:
   identify similarity and inclusion relationships with associated proofs for the same predicates based on edges of the DRG.

7. The validation node of claim 1, wherein the the processor is further configured to:
   infer new predicates on the nodes of the DRG based on the predicates and the DRG.

8. A method, comprising:
   receiving, by a document validation node in a blockchain network, documents from a plurality of document owner nodes;
   generating, by the document validation node, commitments for the documents on the blockchain network;
   deriving, by the document validation node, proofs to verify predicates of the documents; and
   generating, by the document validation node, a document relationship graph (DRG) based on the commitments and the predicates.

9. The method of claim 8, further comprising:
   verifying the predicates using a hashing algorithm.

10. The method of claim 8, further comprising:
    verifying the documents using non-interactive-zero-knowledge proofs.

11. The method of claim 8, wherein the DRG represents the document commitments as nodes.

12. The method of claim 11, wherein the DRG stores the predicates and the proofs for predicates proven on the documents at each node of the DRG.

13. The method of claim 12, further comprising:
    identifying similarity and inclusion relationships with associated proofs for the same predicates based on edges of the DRG.

14. The method of claim 12, further comprising:
    inferring new predicates on the nodes of the DRG based on the predicates and the DRG.

15. A non-transitory computer readable medium comprising one or more instructions that when executed by a processor of a document validation node in a blockchain network cause the processor to perform:
    receiving documents from a plurality of document owner nodes;
    generating commitments for the documents on the blockchain network;
    deriving proofs to verify predicates of the documents; and
    generating a document relationship graph (DRG) based on the commitments and the predicates.

16. The non-transitory computer readable medium of claim 15, wherein the one or more further comprising instructions further cause the processor to perform:
    verifying the predicates using a hashing algorithm.

17. The non-transitory computer readable medium of claim 15, wherein the one or more further comprising instructions further cause the processor to perform:
    verifying the documents using non-interactive-zero-knowledge proofs.

18. The non-transitory computer readable medium of claim 15, wherein the DRG represents the document commitments as nodes.

19. The non-transitory computer readable medium of claim 18, wherein the DRG stores the predicates and the proofs for predicates proven on the documents at each node of the DRG.

20. The non-transitory computer readable medium of claim 19, wherein the one or more further comprising instructions further cause the processor to perform:

inferring new predicates on the nodes of the DRG based on the predicates and the DRG.

\* \* \* \* \*